United States Patent [19]

Iijima

[11] Patent Number: 5,747,161
[45] Date of Patent: May 5, 1998

[54] GRAPHITE FILAMENTS HAVING TUBULAR STRUCTURE AND METHOD OF FORMING THE SAME

[75] Inventor: Sumio Iijima, Tokyo, Japan

[73] Assignee: NEC Corporation, Tokyo, Japan

[21] Appl. No.: 735,140

[22] Filed: Oct. 22, 1996

Related U.S. Application Data

[63] Continuation of Ser. No. 331,158, Oct. 28, 1994, abandoned, which is a continuation of Ser. No. 941,696, Sep. 8, 1992, abandoned.

[30] Foreign Application Priority Data

Oct. 31, 1991 [JP] Japan ................. 3-313663

[51] Int. Cl.$^6$ ............. B32B 9/00; D01F 9/12; D02G 3/00; C01B 31/04
[52] U.S. Cl. ............ 428/367; 428/34.1; 428/398; 423/447.1; 423/448; 423/447.3; 423/445 B
[58] Field of Search .................... 428/34.1, 367, 428/377, 378, 398, 391; 423/448, 445 B, 447.3, 450, 446, 447.2, 447.1

[56] References Cited

U.S. PATENT DOCUMENTS

| | | | |
|---|---|---|---|
| 3,457,042 | 7/1969 | Ettinger | 423/448 |
| 3,949,115 | 4/1976 | Tamura | 428/367 |
| 3,972,529 | 8/1976 | McNeil | 428/367 |
| 4,014,980 | 3/1977 | Fujimaki et al. | 423/448 |
| 4,157,181 | 6/1979 | Cecka | 428/367 |
| 4,173,670 | 11/1979 | Van Auken | 428/367 |
| 4,628,001 | 12/1986 | Sasaki | 428/367 |
| 4,663,230 | 5/1987 | Tennent . | |
| 4,816,289 | 3/1989 | Komatsu et al. | 423/449 |
| 5,011,566 | 4/1991 | Hoffman | 156/643 |
| 5,151,261 | 9/1992 | Yamanashi | 423/448 |
| 5,227,038 | 7/1993 | Smalley et al. | 423/446 |
| 5,298,298 | 3/1994 | Hoffman | 428/34.4 |
| 5,352,512 | 10/1994 | Hoffman | 428/398 |
| 5,424,054 | 6/1995 | Bethune et al. | 423/447.2 |

OTHER PUBLICATIONS

N. Hamada, et al., New One–Dimensional Conductors: Graphitic Microtubules, vol. 68 No. 10, pp. 1579–1581, 9 Mar. 1992, Physical Review Letters.

S. Iijima et al., Pentagons, heptagons and negative curvature in graphite microtubule growth, Nature, vol. 356, pp. 776–778 (1992).

T.W. Ebbesen and P.M. Ajayan, Large–scale synthesis of carbon manotubes, Nature, vol. 358, pp. 220–222, 16 Jul. 1992.

"International Symposium on the Physics and Chemistry of Finite Systems: From Clusters To Crystals", A NATO Advanced Workshop, Oct. 8–12, 1991, Richmond, Virginia.
141st Committee for Micro–beam Analysis, Materials for 69th Research Society, Sep. 9–10, 1991, Matsuzaka Heights, Japan Society for the Promotion of Science.

Bacon, R., *Journal of Applied Physics*, vol. 31, No. 2, Feb. 1960, pp. 283–290.

S. Iijima, Nature, International Weekly Journal of Science, Helical microtubules of graphitic carbon, vol. 354, No. 6348, pp. 56–58, Nov. 7, 1991 (NEC Corporation, Fundamental Laboratories) (with Abstract).

Lamb et al, Solid C60. Sep. 27, 1990, pp. 254 and 255.

Iijima et al, Preparation of Carbon Narotubes by Arc. Discharge Evaporation, p. 107.

*Primary Examiner*—Newton Edwards
*Attorney, Agent, or Firm*—Burns, Doane, Swecker & Mathis, LLP

[57] ABSTRACT

A graphite filament which has carbon as a basic structural unit and which have a tubular shape being formed with a helical structure with the carbon hexagons as a main structure and with an outer diameter of 30 nm or less. The tubular lattices $a_1$ to $a_3$ are a multiple structure and the interval between inner and outer adjacent tubules is about 0.34 nm, which is similar to the interval between basal planes of graphitic structure. The graphite filament is a new carbon filament material having a structure that is different from a normal graphite filament.

9 Claims, 2 Drawing Sheets

GRAPHITE FILAMENTS HAVING TUBULAR STRUCTURE AND METHOD OF FORMING THE SAME

This application is a continuation of application Ser. No. 08/331,258, filed Oct. 28, 1994, now abandoned, which is a continuation of application Ser. No. 07/941,696, filed Sep. 8, 1992, now abandoned.

BACKGROUND OF THE INVENTION

1. Field of the Invention

This invention relates to novel graphite filament or filaments or whisher or whiskers and a method of forming the same, and in more particular to novel graphite filament or filaments or whisher or whiskers having a tubular structure which comprises a helical structure with carbon hexagons as a basic structure and a method of forming the same.

2. Description of the Prior Art

Carbon atoms are an important element of organic material which makes up living bodies. Also, as the main element in raw materials of petrochemicals, the carbon atoms have deep significance in our lives. Matter made up of simple carbon is chemically very stable and is used in a wide range of fields such as, decorative diamonds, industrial diamonds, carbon filaments, activated carbon, electrode material for steel, construction material for nuclear reactors, high-temperature heating elements, and carbon brushes.

As shown above, carbon is a typical industrial material which can be easily and inexpensively obtained, and it is desired that the industrial application of carbon be expanded.

Formerly, materials composed of carbon atoms had two types of bonding states,, σ-electron bonding and π-electron bonding. The former type of bonding is found in natural diamonds and artificial diamonds, and the latter type of bonding is found in graphite. Also, there are carbon materials which have an amorphous structure that is somewhere between both of these types of bonding.

Graphite is a layered material and is structured with the carbon hexagons spread out two dimensionally and repeated forming layers of graphite sheets. The methods of making graphite carbon materials have already been established and are being used by industry for mass production of graphite.

The methods of making normal graphite materials can be divided into three main types. There is a method of forming graphite using a liquid-phase carbonization process with ground coke and a bonding material as raw materials, there is a method which uses a solid-phase carbonization process using spun polyacrylonitrile, pitch and rayon filaments as they are, and there is a method which thermally decomposes hydrocarbon gases and then performs a gas-phase carbonization process.

Of the carbon materials with graphite type structure, graphite filaments could have been obtained by using the solid-phase carbonization method mentioned above, or could have been formed by thermal decomposition of hydrocarbon gases using metallic granules as a catalyst, or could have been obtained by forming amorphous carbon filaments using metallic granules as a catalyst and then heat-treating these filaments to make graphite. Also, a method is known of where needle shaped graphite could have been grown by applying a direct current discharge between two graphite electrodes in a rare gas atmosphere.

The graphite filaments made using these methods are tens of nanometers (nm) thick or more, and the carbon hexagons have a graphite crystal structure which is positioned nearly parallel to the filament axis, however, the crystallinity is poor. Of course, the tensile strength in the filament axis direction becomes large, however, the chemical stability and electrical characteristics are essentially unchanged from bulk graphite.

For example, one of the prior methods of growing the graphite filaments was proposed in 1960 by Roger Bacon of Union Carbide Co. (U.S.A.) (J. Appl. Phys., Vol. 31, p. 283 (1960)), and in this method direct current is discharged between two carbon-rod electrodes in an argon gas atmosphere at approximately 90 atmospheres, forming graphite filaments with a diameter of 1 to 5 μm and length of 2 to 3 cm on the negative electrode. Using this method, the crystal structure of the resulting graphite filament is the same as that of normal graphite. In other words, each of the graphite filaments is structured with several oblong shaped single crystal graphite bundled around the filament axis, and each oblong graphite crystals bond together along the crystal boundaries to form a polycrystalline structure.

As mentioned above, the chemical and physical properties of carbon materials taking currently known graphitic structures as the main structural unit, are basically the same as bulk graphite. When considering more and more industrial applications of materials made of carbon, a new carbon material having a new structure is desired.

SUMMARY OF THE INVENTION

An object of this invention is to provide a carbon material having a different structure than normal graphitic structures and which takes into consideration the aforementioned conditions.

Another object of this invention is to provide a method of forming a graphite filament having a structure which differs from normal graphitic structures.

According to one aspect of this invention, there are provided a graphite filament comprising a tubular structure, the tubular structure being formed having a helical structure with carbon hexagons as a main structural unit, and the outer diameter of the graphite filament being 30 nm or less.

According to another aspect of this invention, there is provided a method of forming a graphite filament which comprises discharging a direct current arc between negative and positive carbon-rod electrodes in a rare gas atmosphere under reduced pressure and applying the discharge continuously for a given period of time to grow the graphite filament on the tip of the negative carbon-rod electrode.

DESCRIPTION OF THE PREFERRED EMBODIMENTS

Graphite filaments or whiskers according to this invention have a new tubular structure which is formed with a helical structure having carbon hexagons as a main structural unit and have an outer diameter of 30 nm or less. Also, the tubular structure comprises a multiple structure with each individual tubule having a helical structure and with the interval between the outer and inner adjacent tubules being similar to the interval between the basal planes of the graphitic structure.

According to this invention, the graphite filaments having a structure different from prior graphite filaments are obtained by carrying out a method of growing graphite filaments using a direct current discharge between graphite electrodes in a rare gas atmosphere. The rare gas includes, for example, helium, neon, argon krypton, xenon and radon. It is preferred to use argon gas.

For example, in this invention, the graphite filaments are obtained by reducing the pressure of the rare gas such as the argon gas to be only a few hundred Torr or less and by setting the discharge current to be about 200 A. Process conditions such as the pressure vary depending on a size of the apparatus, a kind of the rare gas or the like. In an atmosphere greater than atmospheric pressure, each of the filaments is grown to be thick as described above and filaments with the same structure as normal graphite are obtained, however, with the method of this invention it is possible to obtain graphite filaments which have a diameter about 1/1000 that of prior graphite filaments. When analyzing the crystal structure using an electron microscope, the graphite filaments obtained by the method of this invention have a structure crystallographically different than normal graphite filaments.

Figure 2:
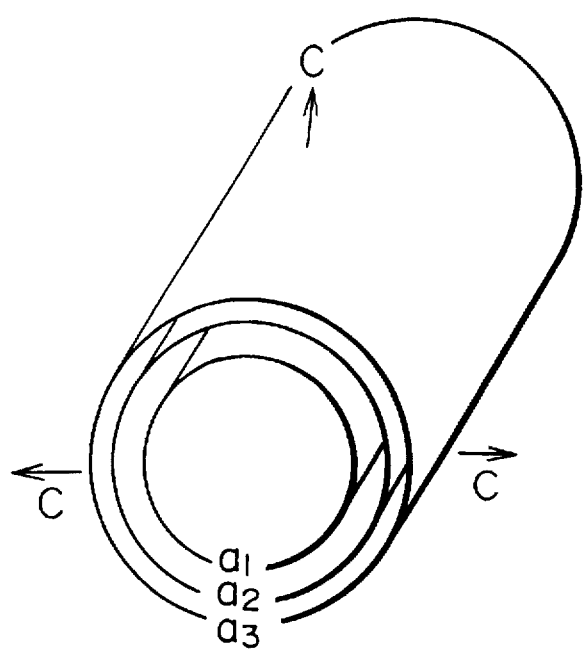
FIG. 2 is a schematic diagram showing an embodiment of tubular strucuture of the graphite filaments formed.

In the electron micrograph of the graphite filaments thus obtained, a lattice image can be seen which is parallel to the filament axis and which is similar to the graphite basal planes. Also, the same number of lattice images appear on both sides of the axis. From this, it can be seen that the graphite filaments of this invention comprise concentric nested tubules arranged to form a few atomic layers of graphite sheets, making up tubular lattices $a_1$, $a_2$, . . . as shown in FIG. 2. Matter with tubular lattices is very rare and can only be seen in natural mineral asbestos. Each of the tubules has a round seamless graphitic carbon structure with the center of the filament being hollow. The interval between inner and outer adjacent tubules is similar to the intervals between basal planes of graphitic structure and was measured to be about 0.34 nm. Also, the wall of the thinnest tubule was found to be only two atomic layers.

The outer diameter of the graphite filaments obtained by this invention is 30 nm or less, with the smallest outer diameter being 4 nm, and with a length up to 1 μm. Also, the carbon hexagons of the tubules making up the graphite filaments are arranged in a helical shape running along the axis direction of the needle shaped graphite.

The helical structure looks very much like the structure found in living matter, such as in the DNA double helix, however, this structure is an inorganic crystal formed with a helical structure and is extremely rare. Each of the tubules of the graphite filaments has a helical structure and this structure is stimulated so that the graphite is grown in the specific direction to form a filament shaped structure. See the representative helical arrangement of the carbon hexagons in FIG. 2.

Following, an explanation of an embodiment of this invention will be given with reference to the drawings.

Figure 1:
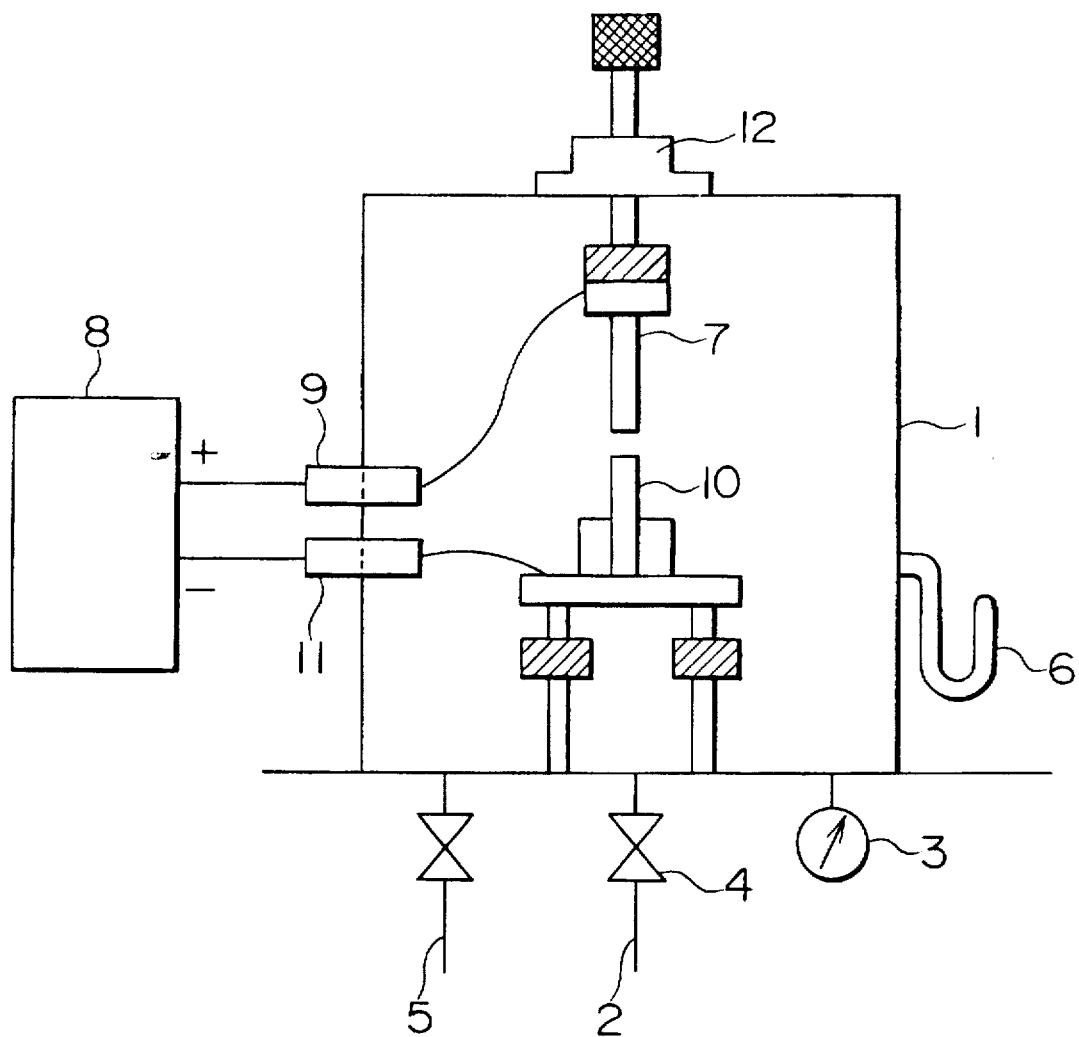
FIG. 1 is a schematic diagram of the apparatus used in forming graphite filaments.

FIG. 1 is a drawing showing an example of the apparatus used for making graphite filaments in an argon gas atmosphere. In the figure, the pair of carbon-rod electrodes 7 and 10, on which the graphite filaments are grown, are placed in the center of a vacuum container 1, and the air is removed from the container 1 using a vacuum air-removal line 2 with a vacuum valve 4. When the pressure reaches a prescribed pressure, for example, about $10^{-6}$ Torr measured with a vacuum gauge 3, the vacuum valve 4 is closed and argon gas is then supplied from a gas supply line 5. The pressure is measured with a pressure gauge 6 and the pressure inside the vacuum container 1 is set to a prescribed pressure.

The carbon-rod electrode 7 is connected to a positive terminal 9 of an electric arc discharge source 8, and the other carbon-rod electrode 10 is connected to a negative terminal 11. The positive carbon-rod electrode 7 is adjusted using an adjustment device 12 so that there is a suitable gap between the electrodes 7 and 10. In order to avoid a rise in temperature due to the heat produced by the electric discharge, a cold-water pipe (omitted from the drawing) is attached to the vacuum container 1 and the electric discharge terminals 9 and 11.

The above apparatus operates as follows.

The two carbon-rod electrodes 7 and 10 have a diameter of 1 cm and a direct current arc was discharged between the electrodes 7 and 10 in an argon gas atmosphere (100 Torr). The discharge voltage was 30 V, the discharge current was set to 200 A and the discharge was applied continuously for 5 minutes. As a result, on the end of the negative carbon-rod electrode 10, a carbon deposit mass was grown with a diameter of 2 cm.

This deposit was comprised of a partially graphitized glass type portion and a graphite filament portion. The graphite filament portion was an accumulation of graphite filaments with an outside diameter of a few nanometers (nm) and the length up to about 1 μm. In this method of making graphite filaments, the structure of the obtained graphite filaments was a multiple tubular structure as shown in FIG. 2. In FIG. 2, three tubular lattices or graphite sheets, $a_1$ to $a_3$ are shown with a representative helical arrangement 20 of the carbon hexagons 30 and C axes are located in a radial direction of the tube, but it is also possible to obtain a multiple structure with two, five, or seven tubules.

For a structure with two graphite sheets, the outer diameter was 5.5 nm, for a structure with five graphite sheets, the outer diameter was 6.7 nm, and for a structure with seven graphite sheets, the outer diameter was 6.5 nm. The diameter of the innermost tubule differs respectively, and for the structure with seven graphite sheets, the diameter of the innermost tubule was only 2.3 nm and was the smallest among the above structures. Therefore, the outer diameter is less than the outer diameter of a five-sheet structure. The outer diameter is often a few nanometers as such and in some case can be 10 nm, 20 nm, and 30 nm.

When the gas pressure was set to 10 Torr in place of 100 Torr as mentioned above, the portion of graphite filaments was reduced, and the portion of glass type carbon was increased. When a helium gas atmosphere was used in place of the argon gas atmosphere and the gas pressure was set to 100 Torr, the portion of graphite filaments was reduced and the portion of glass type carbon was increased.

As the pressure of the atmosphere gas is increased, it was found that the outer diameter of the grown graphite filaments tends to increase. There was sufficient repeatability of the manufacturing process of the graphite filaments described above.

As described above, according to this invention, graphite filaments having a tubular structure formed with a helical structure which differs from the crystal structure of prior graphite filaments are obtained, and the outer diameter of these graphite filaments is 30 nm or less. Due to their peculiar shape, these graphite filaments are expected to have higher mechanical strength than normal graphite or graphite filaments. Also, due to their very minute tubular structure, they can be considered as a one-dimensional quantum wire. It is expected that the electronic structure of these filaments differs from normal graphite, and it is expected that new graphite filaments can be obtained that are metallic like and that can also be used as insulators.

What is claimed is:

1. A graphite filament having a tubular structure and an outer diameter of 30 nm or less, said tubular structure comprising a helical structure of carbon hexagons.

2. The graphite filament as defined in claim 1, wherein said tubular structure comprises more than one helical structure of carbon hexagons.

3. A graphite filament comprising concentric nested tubules, wherein each of the tubules has a round seamless graphitic carbon structure.

4. The graphite filament as defined by claim 3, having an outer diameter of 30 nm or less.

5. The graphite filament as defined by claim 3, wherein said tubules comprise carbon hexagons arranged in a helical shape running along an axial direction of the filament.

6. The graphite filament as defined by claim 3, comprising two, three, five or seven of said tubules.

7. The graphite filament as defined by claim 3, comprising two of said tubules and having an outer diameter of 5.5 nm.

8. The graphite filament as defined by claim 3, comprising five of said tubules and having an outer diameter of 6.7 nm.

9. The graphite filament as defined by claim 3, comprising seven of said tubules and having an outer diameter of 6.5 nm.

* * * * *